(12) United States Patent
Aartsen

(10) Patent No.: US 7,440,620 B1
(45) Date of Patent: Oct. 21, 2008

(54) INFRARED SAFETY SYSTEMS AND METHODS

(75) Inventor: Frank Arthur Aartsen, Mijnsheerenland (NL)

(73) Assignee: Rockwell Automation B.V., Ijssel (NL)

(*) Notice: Subject to any disclaimer, the term of this patent is extended or adjusted under 35 U.S.C. 154(b) by 819 days.

(21) Appl. No.: 10/851,600

(22) Filed: May 21, 2004

(51) Int. Cl.
*G06K 9/68* (2006.01)
*G08B 13/18* (2006.01)

(52) U.S. Cl. .................. 382/218; 382/103; 382/154; 340/552

(58) Field of Classification Search ............ 382/103, 382/107, 154, 181, 199, 209, 218, 274; 340/541, 340/545.3, 552; 348/152–153
See application file for complete search history.

(56) References Cited

U.S. PATENT DOCUMENTS

| | | | |
|---|---|---|---|
| 4,196,425 A * | 4/1980 | Williams et al. | 340/573.4 |
| 5,066,950 A * | 11/1991 | Schweitzer et al. | 340/937 |
| 5,164,707 A * | 11/1992 | Rasmussen et al. | 340/551 |
| 5,334,972 A * | 8/1994 | Sugimoto et al. | 340/556 |
| 5,406,073 A | 4/1995 | Sharp et al. | |
| 5,446,548 A | 8/1995 | Gerig et al. | |
| 6,297,844 B1 | 10/2001 | Schatz et al. | |
| 6,370,260 B1 | 4/2002 | Pavlidis et al. | |
| 6,720,874 B2 * | 4/2004 | Fufido et al. | 340/541 |
| 6,806,811 B1 * | 10/2004 | Readler | 340/541 |
| 6,841,780 B2 * | 1/2005 | Cofer et al. | 250/341.1 |
| 6,998,982 B2 * | 2/2006 | Iwasawa | 340/545.3 |
| 7,084,761 B2 * | 8/2006 | Izumi et al. | 340/541 |
| 2002/0125435 A1 | 9/2002 | Cofer et al. | |

FOREIGN PATENT DOCUMENTS

GB    2366862 A    3/2002

OTHER PUBLICATIONS

European Search Report dated Aug. 29, 2005 for European Patent Application Serial No. 05 01 0799A-2215, 3 pages.

* cited by examiner

*Primary Examiner*—Daniel G Mariam
(74) *Attorney, Agent, or Firm*—Amin Turocy & Calvin LLP; William R. Walbrun

(57) ABSTRACT

The present invention relates to an automated safety system having at least one projector to direct electromagnetic energy into a region of space associated with a security, warning, or safety zone. A detector or detectors senses an interruption of the electromagnetic energy in the region of space by an object or person that may enter the space. The system includes a processor and a storage component, wherein the processor determines the interruption by comparing a current image from the detector with a previously stored image in the storage component. Upon detection, the processor triggers an event based upon the comparison, whereby the event includes such aspects as activating an output, de-energizing a machine, sounding a warning, sounding an alarm, storing data associated with the event, and sending a notification to a local or a remote system, for example.

28 Claims, 10 Drawing Sheets

INFRARED SAFETY SYSTEMS AND METHODS

TECHNICAL FIELD

The present invention relates generally to industrial control systems, and more particularly to a system and methodology that projects electromagnetic energy into a region in order to determine an intrusion of people or objects in the region, wherein the determination is based upon a detection of an interruption in the electromagnetic energy.

BACKGROUND OF THE INVENTION

Many safety systems operate on the principal of first determining what type of object is within a region then potentially disabling some device after the determination. For example, many systems within the infrared safety domain utilize techniques that combine images then analyze the combined image via pixel spectral power, density and/or threshold values. Other techniques include measuring thermal properties; measuring moving surfaces (reflectivity, smoothness, and so forth.); and techniques utilized to determine position. The following provides a brief description and examples of some current implementations that employ one or more of the above techniques.

One example includes a remote sensing system for real time monitoring of patient position which can report variations in patient setup from day to day as well as motion during individual treatments. In particular, this type system includes: (a) a source of radiation for applying radiation to a patient; (b) targets affixed to the patient for reflecting radiation impinging thereon; (c) two cameras and a computer for detecting the reflected radiation and for determining the current position of the targets in three-dimensional space; (d) a data store for storing the position of the targets; (e) the computer also serving to compare the current position of the targets with positions stored in the data store; and (f) a display for displaying indicators whenever differences between the current position and the stored position exceed tolerances stored in the data store. This type of system employs reflected radiation for determining the position of a person.

Another example includes a system for detecting presence and/or motion of a person or other movable entity within a selected space. Detection is accomplished by detecting reflected light or other radiation from the space, presence being signified when detected radiation differs from an established background, either up or down, by an amount exceeding a predetermined threshold. Blending of the entity with the background is avoided by viewing the entity at least two different angles with different backgrounds, for example by use of two spaced detectors, and variations in background are automatically compensated for when a presence indication persists for a selected period of time after the last motion indication is received. The background is updated to the current level when this occurs. With light radiation, light sources are structured to irradiate substantially the entire space and saturation of a detector by ambient radiation is avoided by providing a band-pass filter which passes only radiation in a narrow overlap wavelength band for the radiation sources and detectors. This type system operates by analyzing reflected radiation from the space, wherein differences in the reflected radiation are detected.

In yet another example, a system includes an infrared detector having two cameras for viewing a scene to detect humans. The cameras focus the scene on respective pixel arrays. One array is designed with a filter to be sensitive to light from 0.8 to 1.4 microns and the array of the other camera is designed with a filter to be sensitive from 1.4 microns to 2.2 microns. The arrays are co-registered spacially and temporally relative to the viewed scene and pixel transmission dynamics. The spectral powers of the pixels from both arrays are difference weighted and fused into one set of pixels. The fused pixels are thresholded into another set of pixels that have one of two values—black or white. These pixels are entered into a visual display that shows a segment image of a human if in the viewed scene. This type system employs image processing techniques that analyzes spectral densities associated with pixels.

Another system includes a camera arrangement for detecting an object such as a driver or a child seat located on, above or in front of a vehicle seat. The system includes a camera for creating an image of any object in that position, and also includes an electromagnetic wave source such as an infrared light source. An image created with the source operational is stored in a first store and an image created with the source non-operational is stored in a second store. The stored images are then subtracted and any object in the subtraction image is identified by an image processor. The position of the object may also be determined and used to inhibit or modify the operation of a safety device such as an airbag in the vehicle. This type of system identifies an object by digital subtraction of images taken before and after illumination by a source.

Although the above systems serve various applications, these systems suffer in that reflected radiation from the object must first be received by a detector and then post processed in order to make a determination or identification regarding the object. These types of analyses can be prone to error depending on the reflectivity of the object, speed of the object, and other factors associated with object variables.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology that projects electromagnetic energy into a region (or regions) in order to determine an intrusion of people or objects in the region. The determination is based upon a detection of whether or not an interruption has occurred within the region as opposed to positively identifying what may have actually entered into the region. Thus, indications of intrusion can be made in a straightforward, reliable, economical, and highly robust manner by detecting the absence of energy rather than attempting to resolve or compute items within an image. After detection, an output device may be employed to disable equipment operating in or near the region in order to protect people or objects that may have entered the region. Also, a notification may be sent or logged for further analysis indicating that an intrusion has occurred.

In one aspect, one or more projectors direct electromagnetic energy (e.g., infrared spectrum images) into an area or region designated as a security or safety zone. One or more cameras or digital detectors record an image from the energized region during a period when only allowed objects (or no objects) are in the region. For example, a space designated as a security zone may contain zero or more objects that normally occupy such space. The captured image from the space of allowed items (or no items) within the space is then stored by a processor. As time goes by, the processor and detector capture current images from the space at predetermined intervals.

After capturing a current image, the processor compares the current image with the previously stored image that contains allowed items. If an intrusion has occurred, portions of energy received by the detector is blocked or shielded from reaching the detector by the intruding device or person. Thus, after image comparison (e.g., digital subtraction of images), the processor detects a shadow (e.g., pixels not energized) in the current image, wherein such detection can then trigger further actions. For example, if a shadow or energy blockage is detected, hazardous equipment can be disabled or other events can be triggered such as sounding a warning. Other aspects include employment of multiple cameras for detecting differences with stored images, wherein differences detected by any of the cameras can trigger further actions. Also, multi-camera arrangements can be employed for three-dimensional reconstructions of an area for detecting objects or people therein.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating automated intrusion detection within a region of space in an industrial controller environment. An automated safety system is provided having at least one projector to direct electromagnetic energy into a region of space associated with a security, warning, or safety zone. A detector or detectors senses an interruption of the electromagnetic energy in the region of space by an object or person that may enter the space. The system includes a processor and a storage component, wherein the processor determines the interruption by comparing a current image from the detector with a previously stored image in the storage component. Upon detection, the processor triggers an event based upon the comparison, whereby the event includes such aspects as activating an output, de-energizing a machine, sounding a warning, sounding an alarm, storing data associated with the event, and sending a notification to a local or a remote system, for example. The processor and associated projector/detector can project/construct two-dimensional images or three-dimensional images in order to determine the interruption.

It is noted that as used in this application, terms such as "component," "model," "system," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

Figure 1:
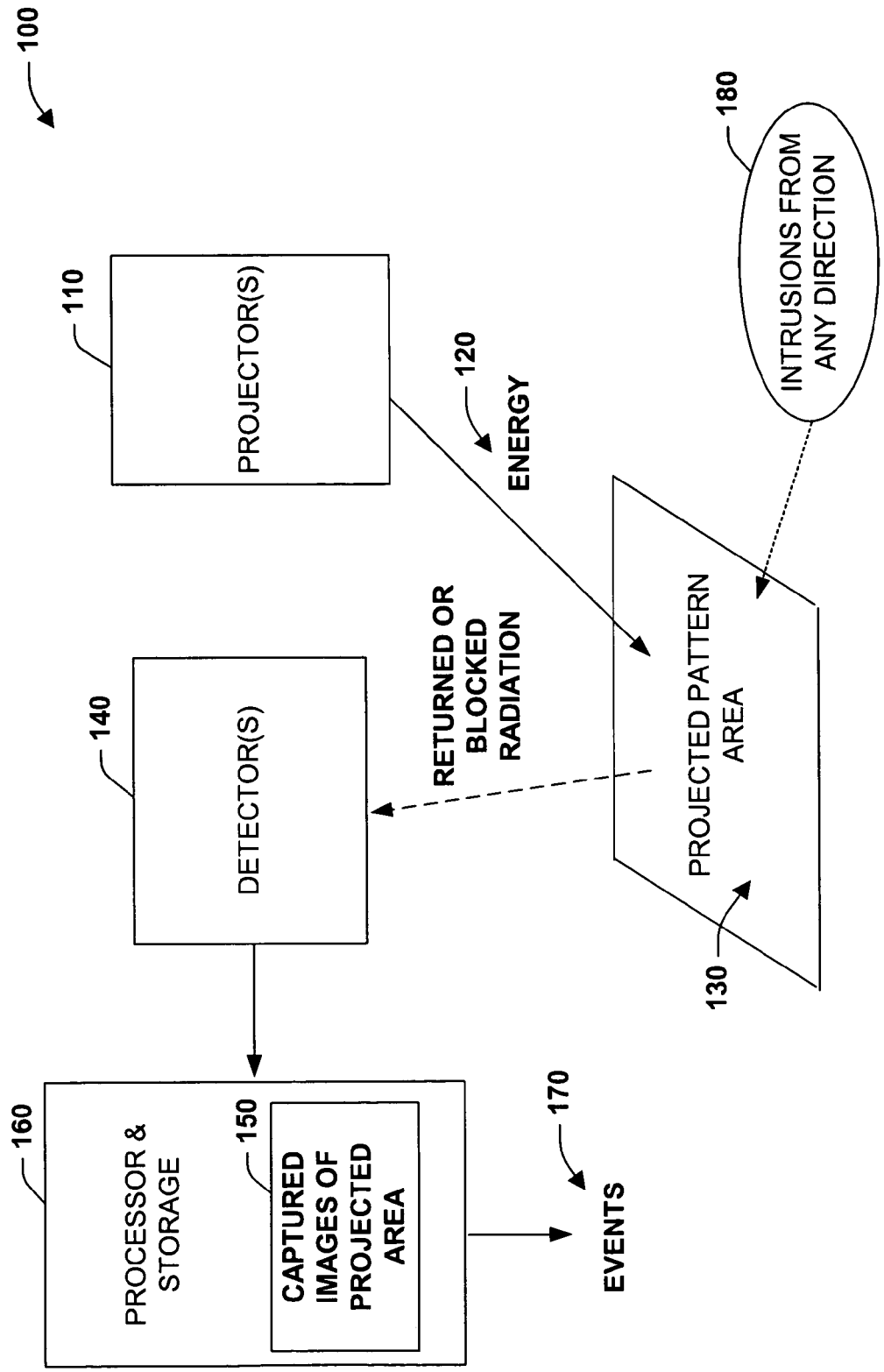
FIG. 1 is a schematic block diagram illustrates an automated safety system in accordance with an aspect of the present invention.

Referring initially to FIG. 1, a system 100 illustrates an automated safety system in accordance with an aspect of the present invention. The system 100 includes one or more projectors 110 that direct electromagnetic energy 120 (e.g., infrared spectrum images) into an area or region 130 designated as a security or safety zone. In general, infrared radiation or energy 120 is selected since this type of radiation is invisible to the human eye. However, it is to be appreciated that other frequencies such as visible frequencies may be employed. One or more cameras or digital detectors 140 record an image 150 from the energized region 130 during a period when only allowed objects (or no objects) are in the region. For example, the region 130 can be allocated as a security zone that may contain zero or more objects that normally occupy the region. The captured image 150 from the space of allowed items (or no items) within the region 130, is then stored by a processor 160 having associated memory components and respective processor support components. As time goes by, the processor 160 and detector 140 capture current images 150 from the region 130 at predetermined intervals (e.g., at 10 or 20 hertz intervals).

After capturing a current image 150, the processor 160 compares the current image with the previously stored image that contains allowed items. If an intrusion has occurred in the region 130, portions of energy received by the detector 140 is blocked or shielded from reaching the detector 140 by the intruding device or person. It is noted that intrusions may occur from substantially any direction into the region 130 as illustrated at 180 (e.g., up, down, left, right, from an angle and so forth). Thus, after image comparison (e.g., digital subtraction of images), the processor 160 detects a shadow (e.g., pixels not energized or lightly energized) in the current image 150, wherein such detection can then trigger further actions. For example, if a shadow or energy blockage is detected, hazardous equipment can be disabled or other events can be triggered at 170 by the processor 160 such as sounding a warning or sending a notification (e.g., electronic message, e-mail). It is also noted that thresholds can be set up in the processor 160 to make intrusion determinations (e.g., more than three pixels having lower returned energy, fire an event).

The system 100 can be employed in various applications that are designed to facilitate safety in an industrial environment. In one aspect, the system 100 can be employed as an Infrared Safety Camera targeted for applications in which a machine or installation can be stopped in any position in its production cycle. This can include machine stoppage via the event 170 which can trigger an output device such as a relay, for example. The system 100 is typically not employed to safeguard installations with rundown time or end-of cycle applications. Examples of safety applications (e.g., where machines are shut down upon detecting intrusion) include: robotic cells (welding, assembly), packaging machines, large machine entrances, hot storages such as in foundries, and so forth. This system 100 can also apply to the following example industries:

Automotive industry: Welding robots
    Assembly cells
    Transfer lines

General industry: Packaging
    Storage and retrieval
    Handling systems
    Conveyor systems Steel industry: Hot storages
    Dusty environments
    Other industries where machine/human safety or security is of concern.

Other example applications include employment of multiple cameras for detecting differences with stored images, wherein differences detected by any of the cameras can trigger further actions. Also, multi-camera arrangements can be employed for three-dimensional reconstructions of an area for detecting objects or people therein. These applications are described in more detail below.

Figure 2:
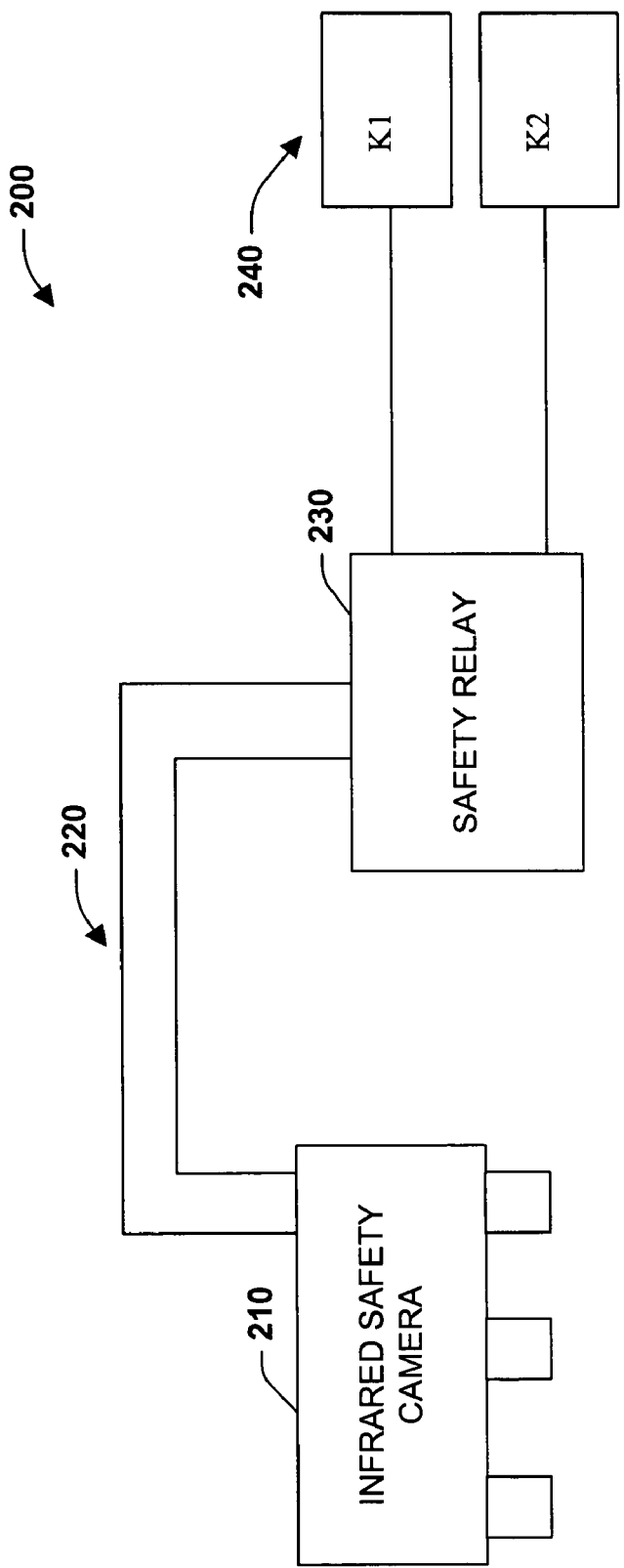
FIG. 2 is a schematic diagram illustrating an example detection system in accordance with an aspect of the present invention.

Referring now to FIG. 2, an example detection system 200 is illustrated in accordance with an aspect of the present invention. The system 200 includes an Infrared Safety Camera 210 providing two PNP safety outputs 220 that drive a safety relay 230 having associated contacts 240. The Infrared Safety Camera 220 can be designed to safeguard man and machine against hazards through moving parts and stored energy. The Infrared Safety Camera 220 can be part of a safety system 200 in which the Infrared Safety Camera has the function of a presence-sensing device, whereas other parts such as the safety relay 230 and contactors 240 are employed for disabling devices after presence has been detected.

In one example, the Infrared Safety Camera 210 includes a single infrared projector, two infrared cameras, a safe processor, software for the processor, and two safe outputs 220. The projector can be mounted in a housing with the respective cameras (e.g., respective cameras on either side of projector) and the processor may be constructed in the same housing with the safe outputs 220, if desired. The projector projects a pattern on a surface, (crosses, stripes, or other pattern), whereby it is not required the surface is flat. Typically, both cameras are aimed at the same area as where the pattern is projected, whereby the respective cameras are generally situated at a slightly different angle.

The following describes example operations of the system 200 although other operations can also be provided.

In one example, each of the cameras has a picture stored that was taken at the time of machine installation. A current picture or image taken at regular intervals (e.g., 10 Hz) is compared with a stored picture or image. When one of the cameras detects a difference with the stored picture, it is compared with the active danger area to switch the status of the outputs 230.

In another example, the cameras combine a current picture and form a 3 D relief, as soon as the 3 D relief alters, the processor determines if the change takes place inside a danger zone (as with a laser scanner) if so, the outputs 220 of the Infrared Safety Camera 210 change state.

The following aspects describe various features of the Infrared Safety Camera 210:

Pattern: By projecting a regular pattern this can be regarded as a form of detection Resolution, rather than taking a picture and depend upon the density of pixels. If an object such as an arm, leg, etc. enters the zone where the pattern is projected, a shadow is created on the place where before the projection was (See FIGS. 3 and 4 below). The shadow or obstruction is then detected by the cameras. If the pattern on the surface is for instance 40 mm (50 mm minimum detectable object size), this may be observed as limb detection in conformity with specification EN61496, for example.

Light: In general, the pattern projected should be invisible, non-hazardous infrared light with a wavelength between 840 nm and 950 nm. There is generally no need for coding the light source (projector).

Optics: The projector can optionally be equipped with a zoom lens with adjustments for setting focus.

Software: Through software, the Infrared Safety Camera 210 can be programmed in a similar way as a safety laser scanner and can include warning zones and safety zones which are described in more detail below.

Programming: A wired connection should be employed to visualize the combined life picture taken by both the cameras. Through this picture, the safety zone(s) and warning zone(s) can be independently programmed. This can be achieved in a similar manner as the commercially available ABGM SafeZone Safety Laser Scanner, for example.

Mounting: The Infrared Safety Camera 210 can be designed to be mounted vertically above a hazardous area or in the vicinity, looking under an angle toward or away from the hazard. Optionally, for some applications it is also possible to mount the camera horizontally.

Figure 3:
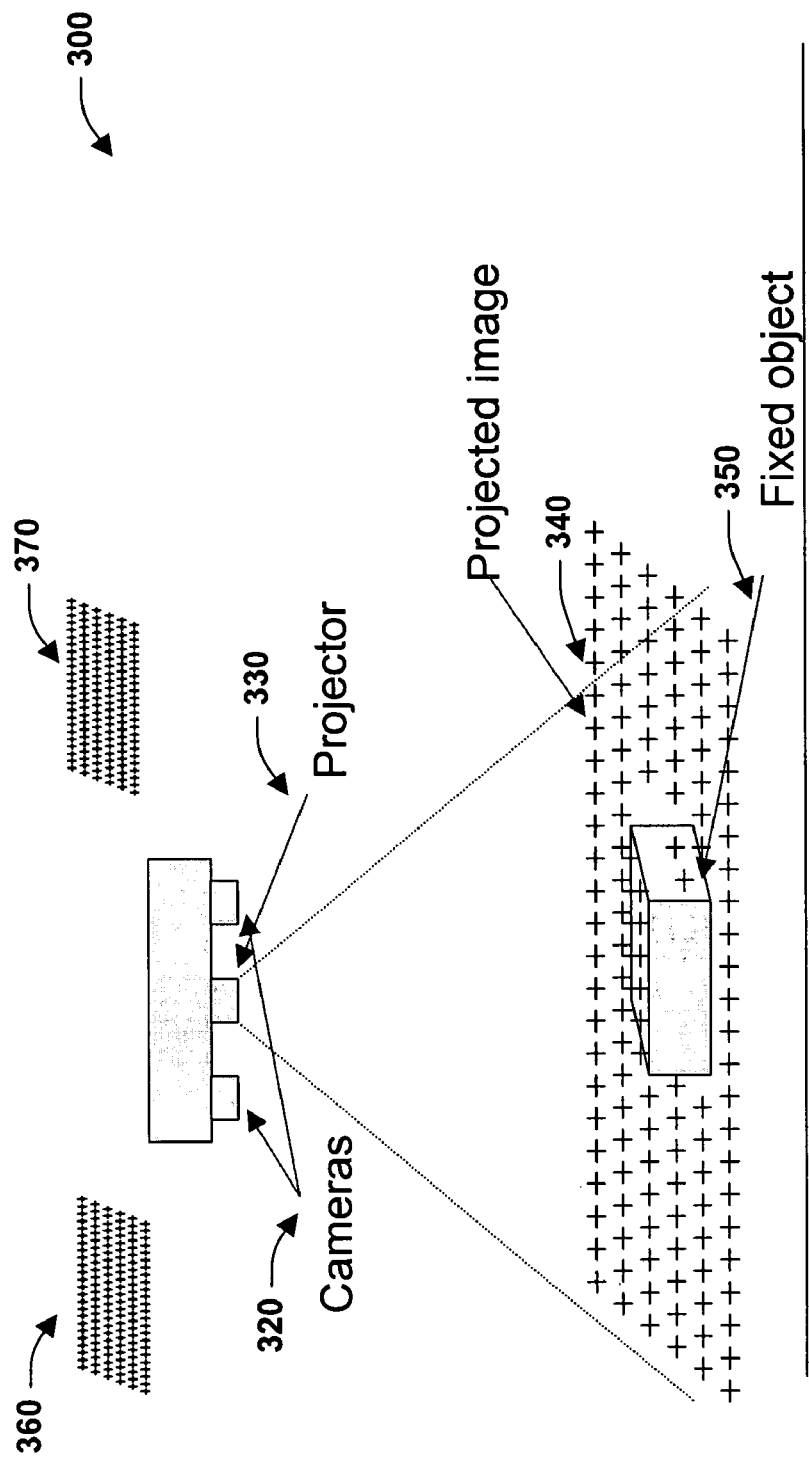
FIG. 3 is a diagram illustrating a projected image in a clear zone in accordance with an aspect of the present invention.

Turning to FIG. 3, a system 300 illustrates a projected image in a clear zone in accordance with an aspect of the present invention. The system 300 includes a safety camera 310 having associated cameras 320 and projector 330. The projector 330 projects an image 340 into a designated zone having a fixed object 350 therein. The zone where the projected image 340 is directed is considered a clear zone during initial installation, thus implying that no objects or people normally not in the zone are present. During this time, the respective cameras 320 capture a picture (pixels) of the image 340. These captured images are illustrated at 360 and 370, respectively.

Figure 4:
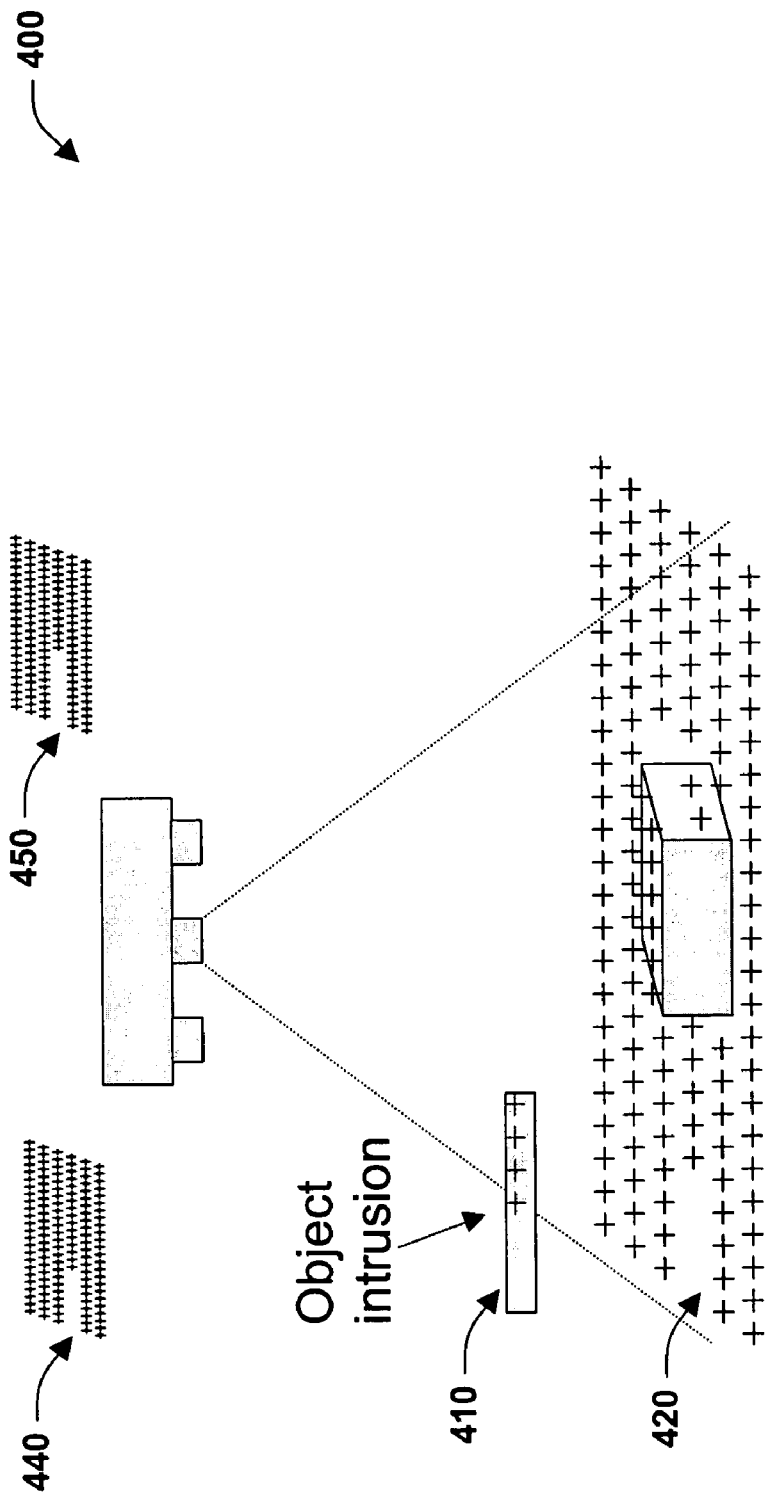
FIG. 4 illustrates a projected image an obstructed zone in accordance with an aspect of the present invention.

FIG. 4 illustrates a projected image in an obstructed zone in accordance with an aspect of the present invention. In this aspect, an object 410 enters the designated zone and blocks electromagnetic energy from being directed in a projected image at 420. When the projected image 420 is then captured by detectors of a safety camera 430, the captured images are shown with missing elements (or lowly-illuminated pixels) at 440 and 450, respectively. Thus, when the images 440 and 450 are compared to images taken without the intruding object 410, a determination can be made that an object has entered the zone since, for example, a subtraction of the respective images would indicate that some of the previously illuminated pixels are now darkened (e.g., lowered in digital value of intensity) by the intrusion. As noted above, after detecting the intrusion, events can be fired that turn off associated machinery or cause other actions to occur.

Figure 5:
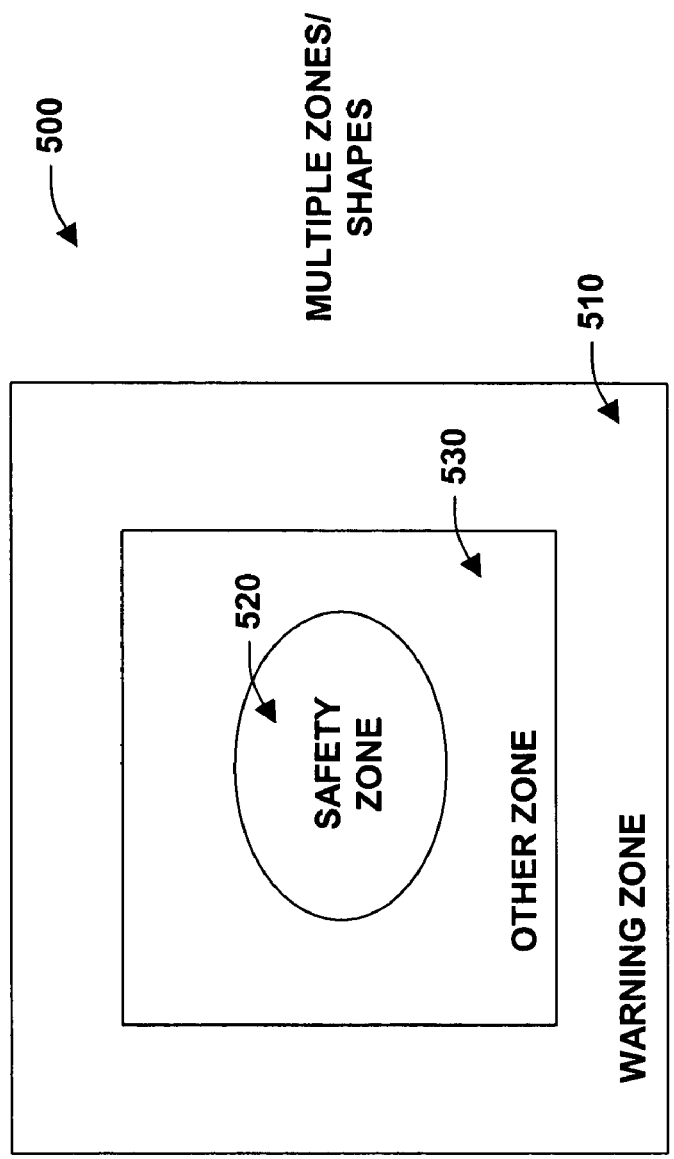
FIG. 5 illustrates multiple zones and shapes for an area in accordance with an aspect of the present invention.

FIG. 5 illustrates multiple zones and shapes for an area 500 in accordance with an aspect of the present invention. In this aspect, the area designated for protection can be sectioned into one or more zones having differing sizes and shapes (e.g., circular, triangular, rectangular, irregular, cubic, and so forth). For example, a warning zone 510 can be configured on an exterior perimeter of the area 500 that if an object is detected therein, a warning or some other indication can be given without actually disabling associated equipment. If an object were to enter a safety zone 520, more direct actions can occur such as actually removing power from respective equipment. As can be appreciated, one or more other zones 530 can be similarly configured having varying degrees of consequences or events associated therewith for objects entering such zones.

In general, the systems of the present invention are designed for industrial use. Thus, the task is to detect access of persons to dangerous areas 500 and stop the hazardous movement of a machine in this area. A signal is triggered when a person or object enters the monitored area 500 in accordance with the following examples:

If a person or object is present within the warning zone 510, a relay contact can be switched at the corresponding signal output. This signal can be used for acoustic and optical warnings. Warnings are to indicate that the hazardous area is to be left before the protective field is activated, and before the system issues a stop signal that would trigger a machine stop.

If a person or object is present within the safety zone 520 the system switches two independent relay contacts. This signal leads to an immediate switching off of the dangerous machine movement.

Configuration of the Warning, Safety and or other zones can be achieved through commercially available SCD (Safety Configuration and Diagnostic) Windows-based software. Warning and Safety zones are easily configured through the use of the PCs mouse, for example. Actions such as clicking and dragging points along the perimeter of a desired zone to shape the contour of the zone can be easily achieved.

Figure 6:
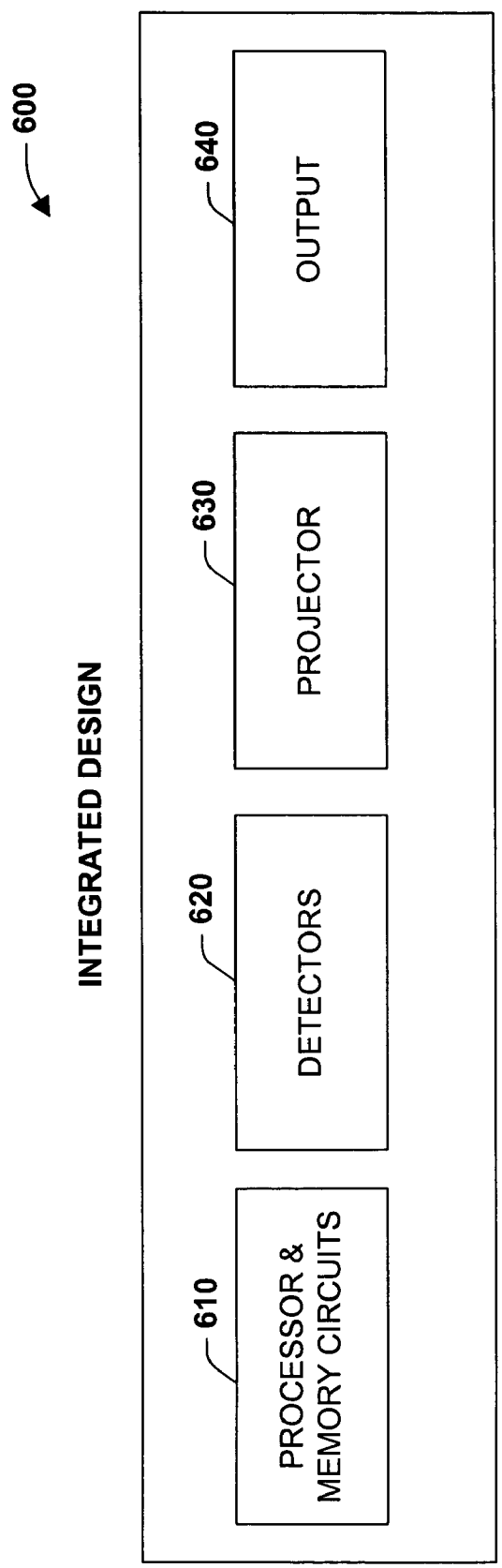
FIG. 6 illustrates an integrated design for a detector in accordance with an aspect of the present invention.

FIG. 6 illustrates an integrated design 600 for a detector and safety instrument in accordance with an aspect of the present invention. This aspect illustrates how various components of the safety systems described above can be packaged into a singular housing. Thus, one or more of the following components may be packaged such as a processor 610 and associated circuits, one or more detectors 620, generally one projector 630, but others can be employed, associated output components 640 that can be triggered by the processor 610 upon detecting an intruding object or person. The output components can include various aspects such as output controls for controlling switches, electronic capabilities such as logging events, or other capabilities such as remote network access for notifying people authorized people of an occurrence(s) of an intrusion. As can be appreciated, the system 600 can be designed in a modular manner, whereby one or more of the components 610-640 are adapted and operate remote from the system.

Figure 7:
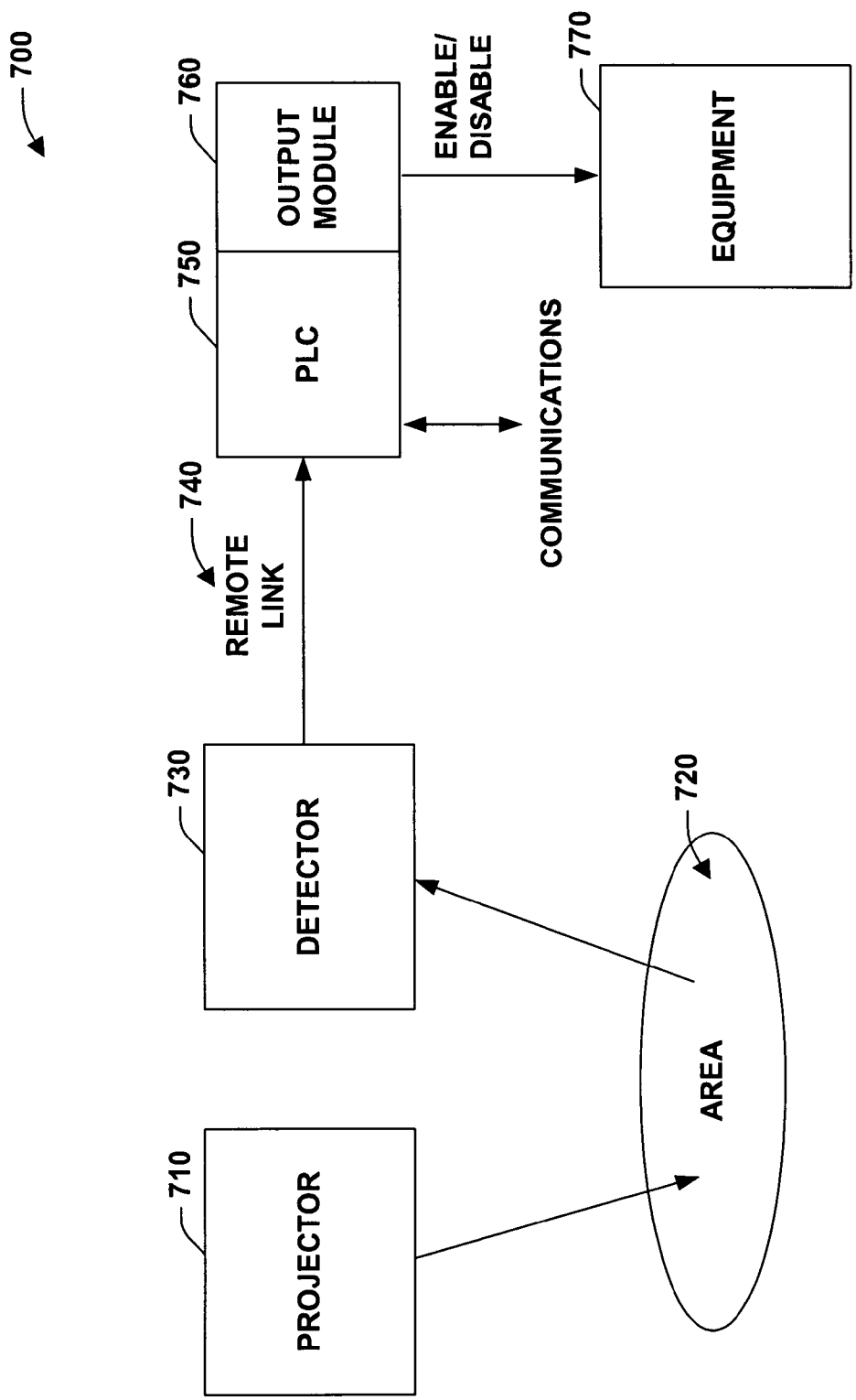
FIG. 7 illustrates a modular design for a detector in accordance with an aspect of the present invention.

FIG. 7 illustrates a modular design for a detector and safety system 700 in accordance with an aspect of the present invention. In this aspect one or more of the respective components of the system may be adapted to work as separate components that communicate with one another. Although this type of system may or may not be adapted as a safety system, such systems could also be employed as a security system, wherein an area is monitored for unwanted intruders and warnings and/or alarms are generated upon detected entry of designated areas. The system 700 includes a projector 710 that projects into an area 720. Radiation from the area 720 is received by one or more detectors 730 that transmit images over a remote link 740 to a programmable logic controller 750.

The controller 750 is associated with an output module 760 that controls equipment 770. Thus, the controller 750 can perform image comparisons and activate or deactivate the equipment 760 via the output module 760. Also, rather than controlling equipment, the controller could monitor one or more areas 720 via various detectors 730, whereby if intrusions are detected in the respective areas, the controller could log the event, send electronic messages to authorities, sound alarms, and/or send messages to substantially any location via wireless mechanisms or more traditional communication modalities such as over the Internet, for example.

Figure 8:
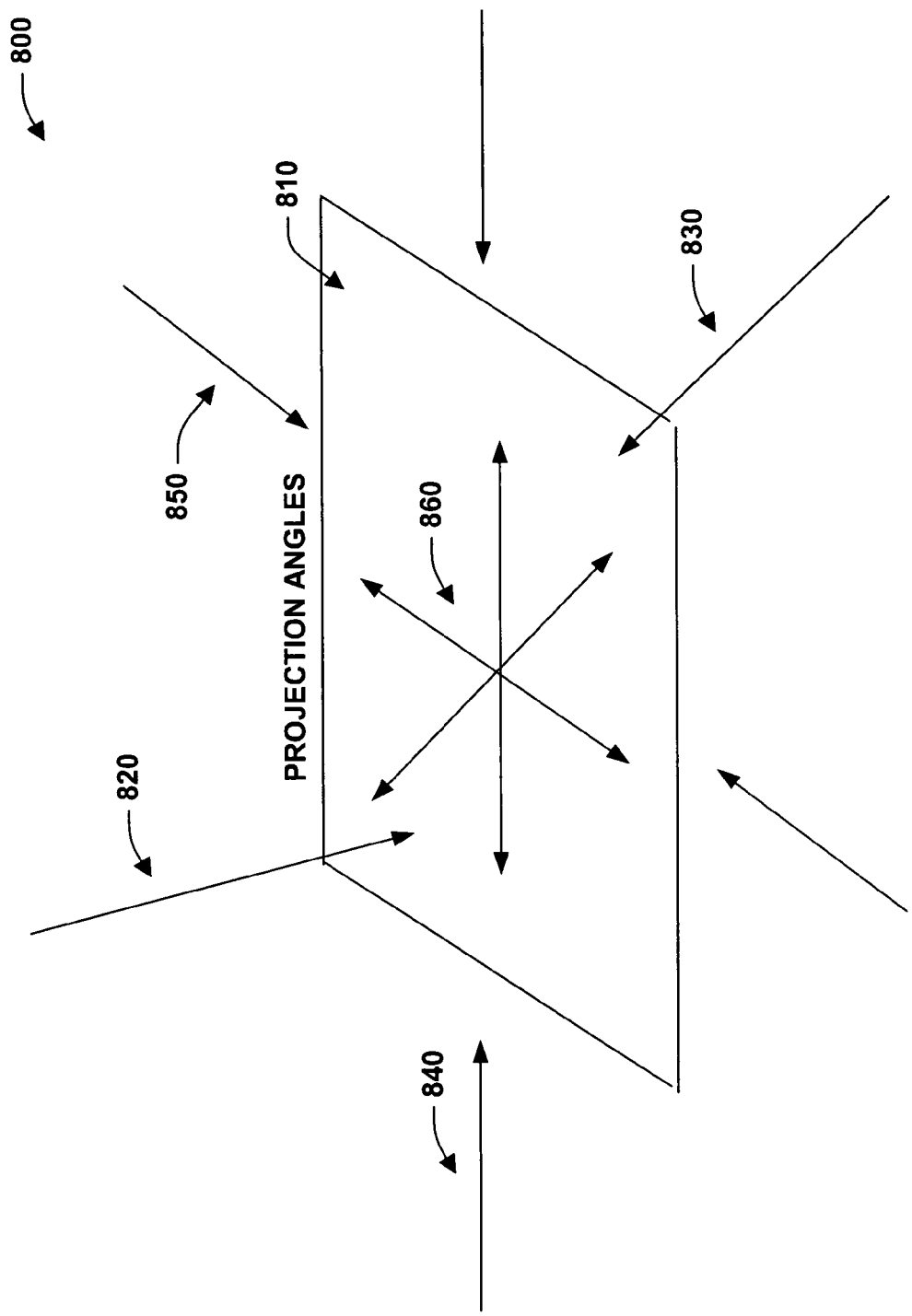
FIG. 8 illustrates projection angles in accordance with an aspect of the present invention.

FIG. 8 illustrates projection angles 800 in accordance with an aspect of the present invention. As noted above, electromagnetic energy can be transmitted to and received from substantially any angle. The diagram 800 depicts different relationships such as energy being provided to an area 810 from above the area at 820 and/or below the are at 830. Also, energy can be directed from differing sides and at varying depths of an area such as at 840 and 850, for example. Also, energy can be received from a plurality of differing angles such as illustrated at 860. As can be appreciated, intrusions can be detected from a plurality of angles and directions.

Figure 9:
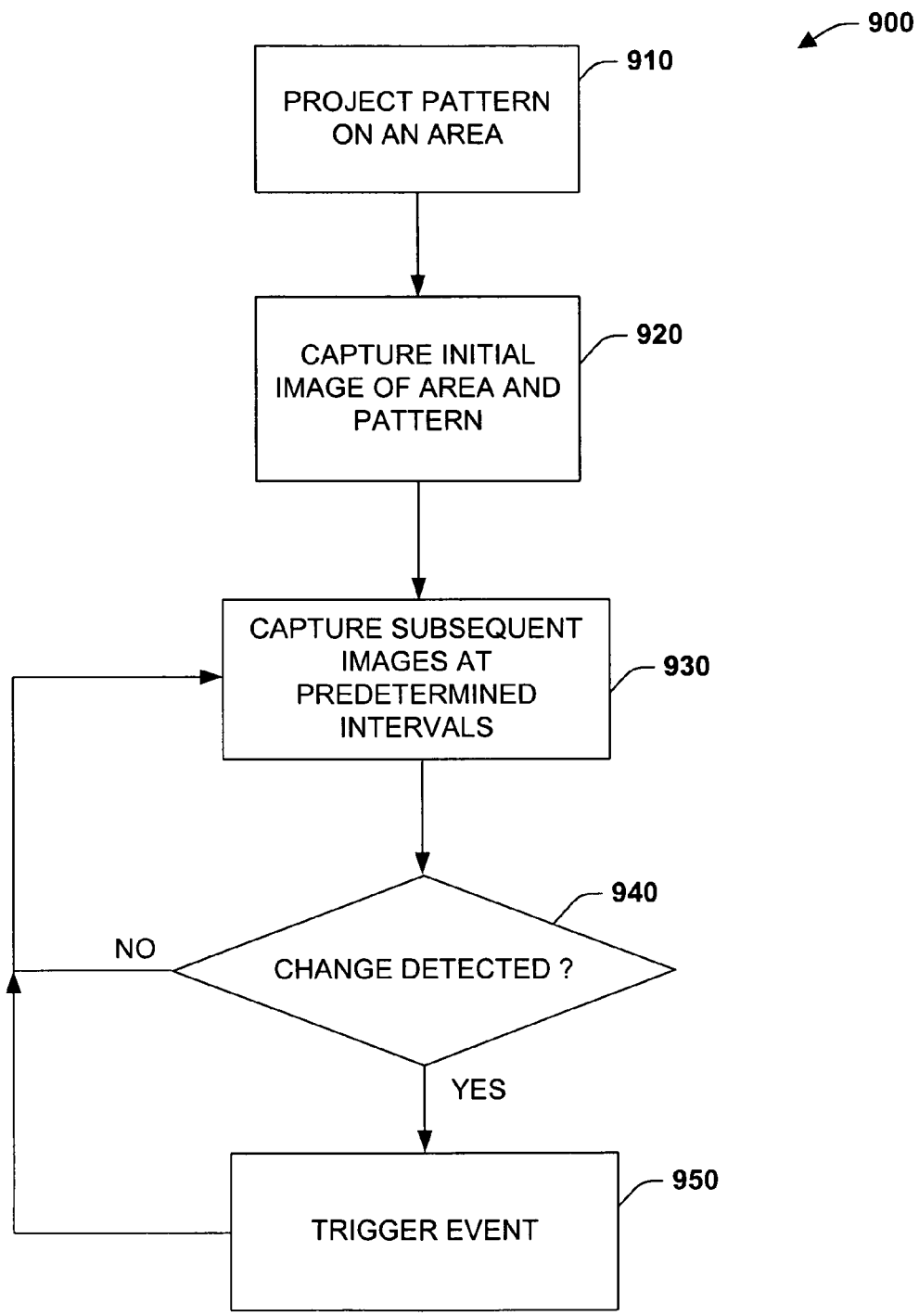
FIG. 9 illustrates a detection methodology in accordance with an aspect of the present invention.

FIG. 9 illustrates a detection methodology 900 in accordance with an aspect the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 910, a pattern is projected as electromagnetic energy on an area or designated zone. As noted above, the pattern can include substantially any type of pattern and the energy can be in the infrared spectrum or other frequency. At 920, an initial image is captured of the pattern during a period when it is known that no unintended objects are in the area. This period often correlates to an initial installation of the system. At 930, during operations, images of the designated area are captured at regular intervals (can also occur aperiodically). At 940, a determination is made as to whether or not an intrusion has occurred. This is achieved by comparing the initial image captured with subsequent images that are captured at 930 and determining whether or not some of the pixels after comparison are at a different intensity than the originally captured pixels. If a change is detected at 940, the process proceeds to 950 and triggers an event such as energizing/de-energizing an output, sounding an alarm, or generating a notification, for example. If no change is detected at 940, the process proceeds back to 930 and continues to monitor for subsequent intrusions into the designated or defined area. As noted above, three-dimensional reconstructions can be created with multiple detectors to determine intrusions in multiple dimensions of space.

Figure 10:
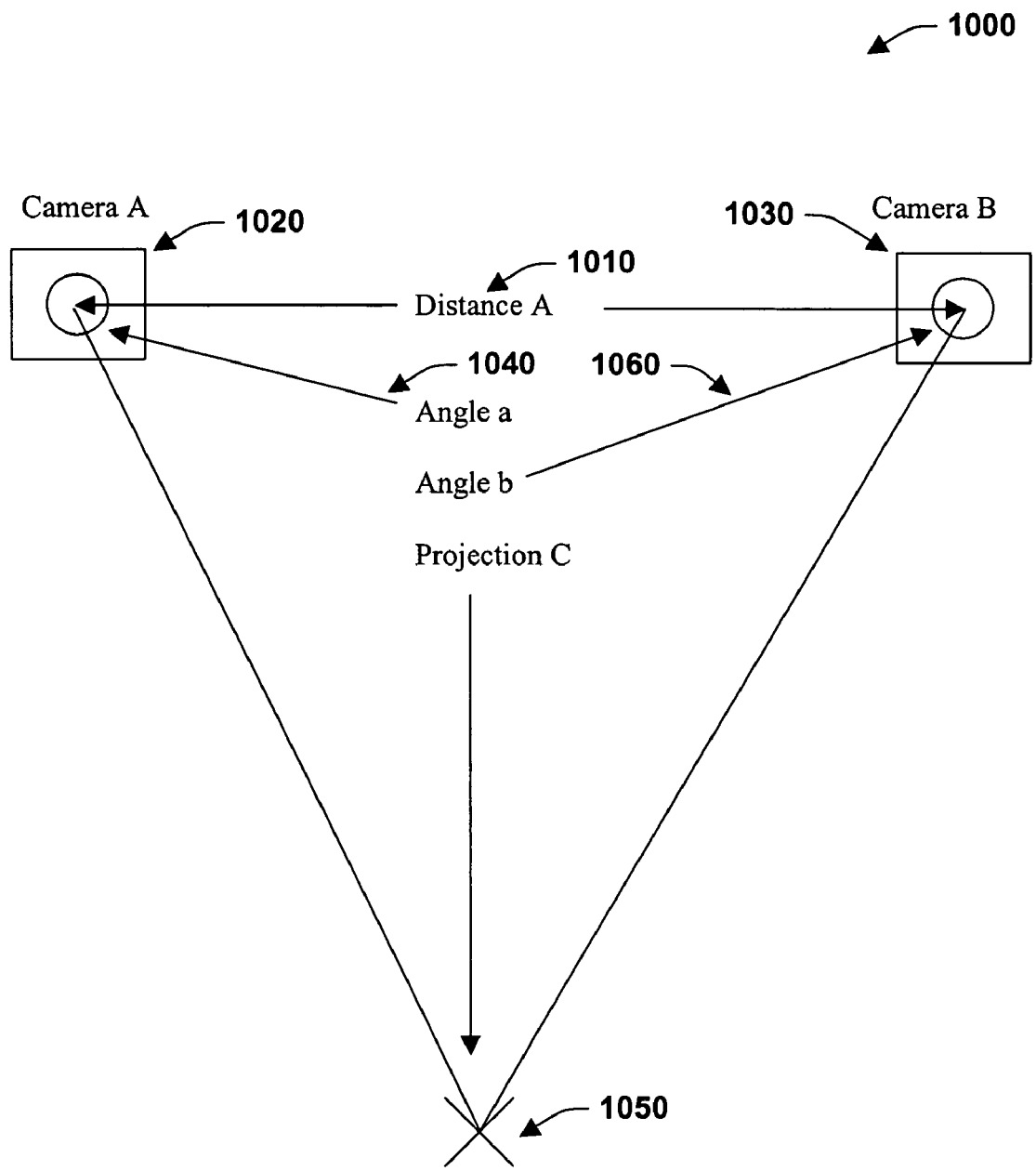
FIG. 10 illustrates an alternative detection system for determining contours in a 3 D image in accordance with an aspect of the present invention.

FIG. 10 illustrates an alternative detection system 1000 for determining contours in a 3 D image in accordance with an aspect of the present invention. In this aspect, a Distance A at 1010 is shown between a camera A 1020 and a camera B 1030, wherein Distance A is defined as a known parameter or distance. An angle a at 1040 under which camera A 1020 receives input from a projection C at 1050 is known as an angle b at 1060 under which camera B 1030 receives input from projection C 1050. Through straightforward trigonometry, it is therefore possible to determine the distances from cameras A 1020 and B 1030 to projection C 1050. If this is performed with all projections, a 3 D contour image results. The angles a 1040 and b 1060 are derived from 2 D pictures created by both cameras 1020 and 1030, respectively. Several aspects of the system 1000 include:

1) Angle measuring: the 3 D picture, built up from the 2 or more 2 D pictures taken by the cameras, is based upon angle measuring. This can be achieved by determining the difference in angle where the same projection is detected by the cameras. The 3 D picture is therefore based upon angle measuring.
2) Recognition zone: in addition to "other zones", besides safety zone and warning zone, it is possible that an object placed in a pre-determined zone, programmed in the safety camera, is used to determine a certain contour, if the contour meets pre-programmed requirements, then this object is allowed to enter a safety zone without causing the outputs to change state. This is similar to a form of muting as with light curtains.
3) Inputs: the camera assembly may be equipped with one or more inputs to activate desired functionality.
4) Configuration storage: The camera may be equipped with a configuration module storing the programmed configuration for ease of exchange-ability.
5) Reference projection: the projector may be equipped with 1 or more reference projections as a basis to synchronize the cameras as part of the total assembly in order to allow angle measuring.
6) Auxilliary projectors: it is possible to equip certain (e.g., moving) objects in the camera's active zone with self contained auxiliary projectors. These emit an energy detectable by the camera assembly, that may be used to track movement of these object(s) to activate other functions in the camera assembly.
7) Other functions: the inputs and/or auxilliary projectors may trigger the camera to change the pre-programmed zones (safety, warning, recognition, other) to an other pre-programmed zone or allow the camera to work with "active" zones, including zones adapting to the actual state of the machinery guarded by the safety camera.
8) System input: the safety camera assembly may be equipped with one or more I/O ports to connect one or more safety camera assembly's with each other forming a functional chain.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An automated safety system, comprising:
   at least one projector to direct electromagnetic energy into a region of space;
   a component that adjusts one or more zones having similar or differing shapes in the region of space;
   at least one detector that senses an interruption of the electromagnetic energy at predetermined or periodic intervals in the zones; and
   a processor and a storage component, the processor determines the interruption by comparing a current image from the detector with a previously stored image in the storage component.

2. The system of claim 1, the processor triggers an event based upon the comparison.

3. The system of claim 2, the event includes activating an output, de-energizing a machine, sounding a warning, sounding an alarm, storing data associated with the event, and sending a notification to a local or a remote system.

4. The system of claim 1, the processor constructs at least one of a two-dimensional image and a three-dimensional image from the detector of claim 1 in order to determine the interruption.

5. The system of claim 1, the electromagnetic energy has a wavelength from 840 nanometers (nm) to 950 nm.

6. The system of claim 1, the region of space is allocated as a security zone that contains zero or more objects that normally occupy the region.

7. The system of claim 1, the interruption is determined by analyzing pixel intensity from a current image as compared to a stored image.

8. The system of claim 7, the interruption is determined from a threshold value related to the pixel intensity.

9. The system of claim 1, further comprising at least a second detector for sensing the interruption, the detector and the second detector adjusted a differing angles.

10. The system of claim 1, further comprising at least one safety output and a safety relay for controlling equipment.

11. The system of claim 1, the projector directs a pattern for the electromagnetic energy into the region of space.

12. The system of claim 1, the projector is equipped with a zoom lens with adjustments for setting focus.

13. The system of claim 1, the zones are configured as a warning zone, a safety zone, or a security zone.

14. The system of claim 1, further comprising a control component that at least one of monitors one or more areas via various detectors, logs events, sends electronic messages to authorities, sounds alarms, sends messages to substantially via wireless, and communicates over the Internet.

15. An automated security system, comprising:
   means for defining a security area;
   means for projecting infrared energy image into the security area;
   means for adjusting one or more zones having similar or differing shapes in the security area;
   means for detecting a blockage in the infrared energy image as received from at least one of the security area or zones by comparing a current image from the detector with a previously stored image.

16. A method for providing automated security for an area, comprising:
   projecting an energy pattern into a defined area;
   adjusting one or more zones having similar or differing shapes in the defined area;
   capturing an initial image of the energy pattern and the defined area;
   monitoring the defined area at predetermined intervals; and
   automatically determining if an intrusion has occurred in a zone by comparing the initial image with subsequent captured images and determining whether or not one or more associated pixels said images after comparison are at a different intensity than initially captured pixels said images.

17. The method of claim 16, the energy pattern is in the infrared spectrum.

18. The method of claim 16, further comprising automatically monitoring the defined area remotely via a control system.

19. The method of claim 16, further comprising at least one of triggering an event, energizing or de-energizing an output, sounding an alarm, and generating a notification.

20. An automated safety system, comprising:
a projector that projects infrared energy into a predetermined area;
at least two cameras that receive the infrared energy from the predetermined area;
a safety output to control machinery; and
a processor that activates the safety output based in part on determining a disruption of the infrared energy from the cameras.

21. An automated safety system, comprising:
at least one projector to direct electromagnetic energy into a region of space;
at least two detectors that are placed at a predetermined distance with respect to each other, the detectors placed at a known angle with respect to the projector in order to determine a three dimensional contour of an object a recognition zone that is programmed in the detectors to determine a contour of an object; and a component to determine if the contour meets pre-programmed requirements, then the object is allowed to enter a safety zone without causing associated outputs to change state.

22. The system of claim 21, further comprising a component for angle measuring that determines a difference in angles where a similar projection is detected by the detectors.

23. The system of claim 21, the detectors include one or more inputs to activate subsequent functionality.

24. The system of claim 21, the detectors are equipped with a configuration module storing programmed configurations for ease of exchange with other detectors.

25. The system of claim 21, the projector is equipped with 1 or more reference projections as a basis to synchronize the detectors as part of a total assembly in order to enable angle measurements.

26. The system of claim 21, the object is equipped with an auxiliary projector that emits an energy detectable by the detectors, and employed to track movement of the object to activate one or more functions in the detectors.

27. The system of claim 26, the functions include triggering the detector to change pre-programmed zones to another pre-programmed zone or enabling the detector to work with "active" zones, including zones adapting to an actual state of the machinery guarded by the detector.

28. The system of claim 21, the detectors are equipped with one or more I/O ports to connect one or more detector assembly's with each other forming a functional chain.

* * * * *